Oct. 4, 1927.
T. V. BUCKWALTER
1,643,977
PROCESS OF MOUNTING ROLLER BEARING CUPS
Filed March 20, 1926    2 Sheets-Sheet 1
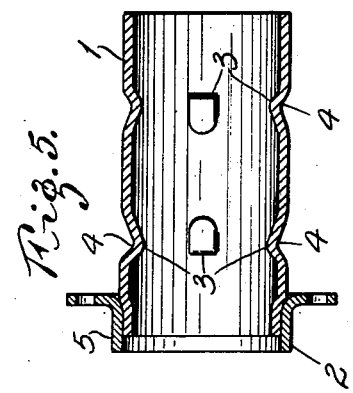
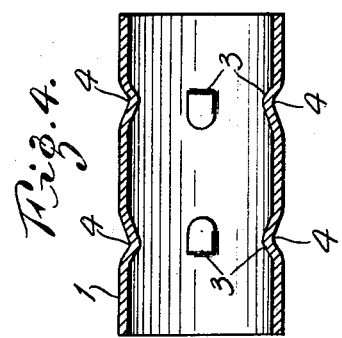
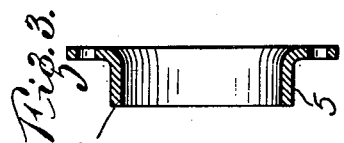
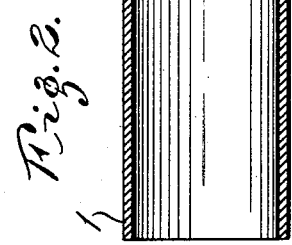
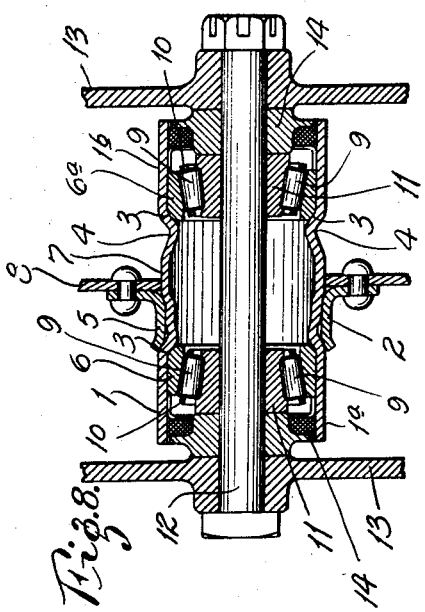
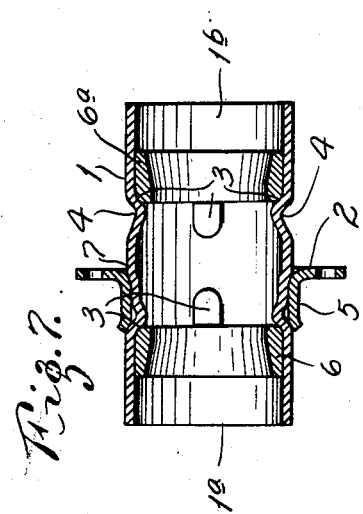
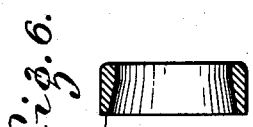
INVENTOR:
Tracy V. Buckwalter,
by
HIS ATTORNEYS

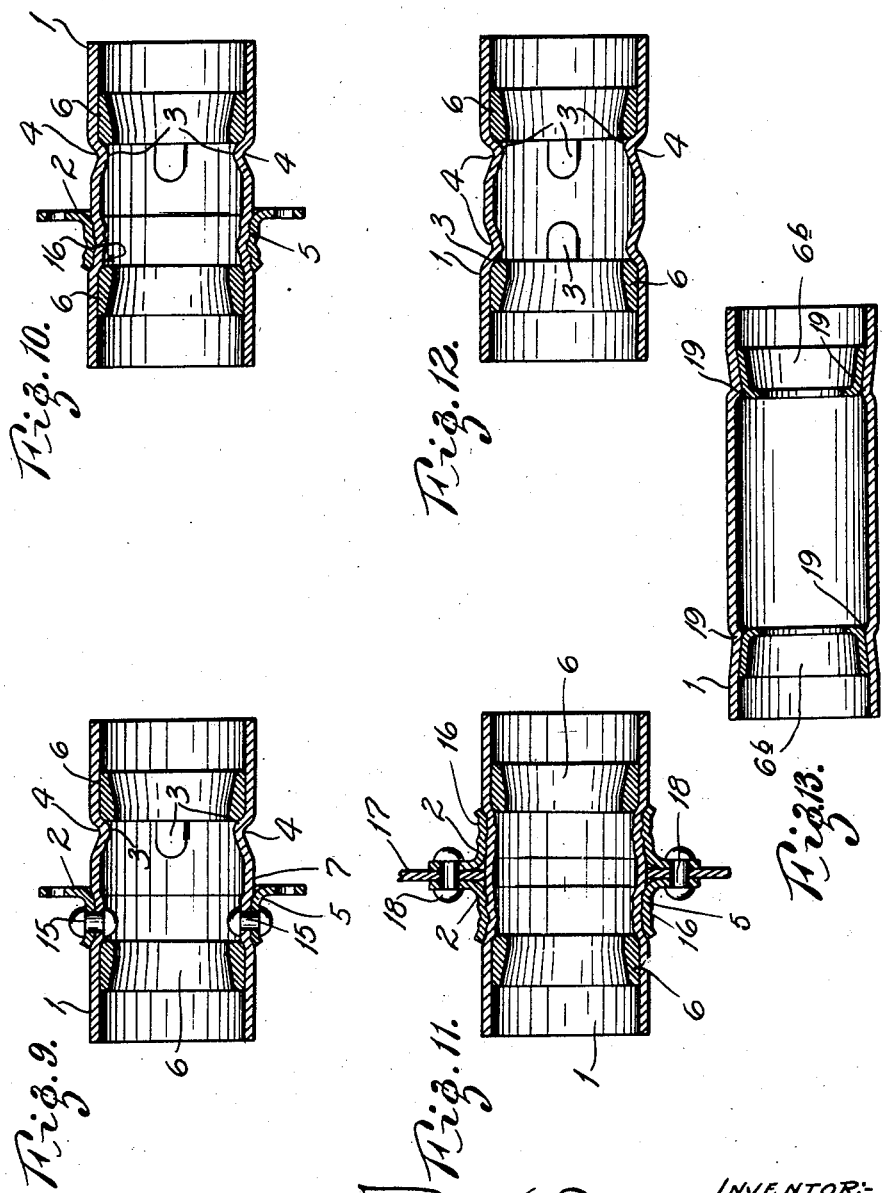

Patented Oct. 4, 1927.

1,643,977

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

PROCESS OF MOUNTING ROLLER-BEARING CUPS.

Application filed March 20, 1926. Serial No. 96,173.

My invention relates to a process of mounting roller bearing cups in hollow hubs or the like. Heretofore the practice of mounting roller bearing cups in hubs and the like has required the outer surface of the cup and the inner surface of the hub to be finished within close limits of tolerance, as from one-thousandth to two-thousandths of an inch. The expense of such close finishing adds so much to the cost that roller bearings have been heretofore excluded from many uses to which they are otherwise applicable. The purpose of the present invention is to devise a process that will dispense with such accurate finishing and provide for the mounting of the cup and associated parts of the hub more economically than has heretofore been practicable.

The invention consists principally in the process hereinafter described wherein the bearing cup and the hub are sized and fitted by the operation of mounting the cup in the hub. It also consists in the process hereinafter described and claimed.

In the accompanying drawing, wherein like reference numerals refer to like parts wherever they occur, Fig. 1 is an end view of a section of tubing that constitutes the blank from which the hub is made, all of the other figures being longitudinal sectional views;

Fig. 2 is a view of the hub blank;

Fig. 3 is a view of the blank that constitutes the spoke flange or similar flanged member;

Fig. 4 illustrates the hub blank with inwardly extending shoulders pressed therein;

Fig. 5 illustrates an early stage of the operation of pressing the wheel flange onto the hub;

Fig. 6 illustrates the conical bearing cup;

Fig. 7 illustrates the hub with the wheel flange and bearing cup pressed in final position;

Fig. 8 illustrates said hub with all bearing parts assembled and mounted on a suitable yoke; and Figs. 9, 10, 11, 12 and 13 illustrate modifications hereinafter described.

In carrying out the present invention, the hub 1 is made from a section of tubing of some material, such as steel, that will permit of the plastic flow required by the operations hereinafter described. This section of tubing 1 is of the length required for the finished hub and with its inner and outer surfaces concentric, so that the wall thereof is of uniform thickness. The outer diameter of the tube is slightly greater than the inner diameter of a collar 2 of angular section, hereinafter mentioned; and inwardly projecting shoulders 3 are formed on the inner surface of said hub at suitable points for the roller bearing cup to bear against. Preferably these inwardly extending projections 3 are made by pressing the wall of the hub 1 inwardly thereby forming depressions 4 in the outer surface thereof.

The first step in assembling the parts is to press said collar or flange 2 lengthwise of the hub 1; and as the inner diameter of said flange is less than the outer diameter of the hub, the effect is to cause a plastic flow of the metal of the hub and thereby contract the diameter of such portion thereof as the flange is forced over. The outwardly extending portion 5 of the flange 2 is preferably forced past the depressions 4 in the outer surface of the hub, leaving the tubular portion of said flange 2 over said depressions.

After the said flange 2 has been forced to its desired position, the roller bearing cup 6 is forced endwise into the hub 1 until it brings up against the shoulders 2 provided therefor in the interior of the hub. The initial outside diameter of the roller bearing cup 6 is greater than the diameter of the portion of the hub 1 that has been reduced by the action of the flange 2, so that the metal of the hub is again stretched beyond its elastic limit and caused to flow plastically to permit said cup to reach home. This expansion of the diameter of the hub 1 by the roller bearing cup 6 has the effect of tightening the flange 2 in place and of forming a circumferential rib 7 opposite the end thereof that is well calculated to prevent longitudinal movement of said flange.

Where only one flange 2 is used on the hub, as in Fig. 7, only one end 1ª of the hub 1 is reduced by the flange; and in such case the roller bearing cup 6ª that is forced into the opposite end 1ᵇ is of an outside diameter slightly less than the inside diameter of said opposite end.

After the hub is provided with the flange 2 (which may be adapted to serve as a securing member for wheel spokes, or to serve other suitable purposes) and the bearing cups 6, the outer parts of the bearings are applied and the construction assembled into a complete structure in accordance with any suitable practice. For instance, Fig. 8 illustrates a member 8 or members riveted to the flange and which may be the spokes or web of a wheel, or pulley or the like. Likewise, the structure embodies taper rollers 9 with cages 10 and cones 11 therefor, all mounted on an axle 12 mounted in a suitable framework 13 and with oil and dust excluding devices 14. Other applications of my hub will readily suggest themselves.

In the modification illustrated in Fig. 9, one set of pressed shoulders 3 is dispensed with and the flange 2 is secured to the hub by rivets 15. This arrangement furnishes enough of a shoulder for the roller bearing cup to bear against.

In the construction illustrated in Fig. 10, the flange 2 is additionally secured on the hub 1 by a circumferential corrugation 16 thereof which arrangement also produces a sufficient abutment for the cup 6.

In the modification illustrated in Fig. 11, there are two hub flanges 2 which are pressed onto the hub from opposite ends thereof and have a disk 17 or spoke members secured between them by means of rivets 18 or the like.

In the modification illustrated in Fig. 12, the collar or flange 2 is wholly dispensed with, this construction being suitable for use for conveyor rollers or the like.

In the modification illustrated in Fig. 13, the cup 6$^b$ is of substantially even thickness throughout and the outer surface thereof is tapered. Conical seats 19 for each cup are formed in the tube, preferably by pressing and the outer diameter of the cup at its large end is somewhat greater than the inner diameter of the tube. When the cup is forced into the tube, it is held by the seat 19 therefor and by the firm engagement of the outer end portion of the cup with the tube 1. The taper of the outer surface of the cup and of the seats therefor may be less than the angle of repose for the respective metals; so that the cup will not slip off the seat.

It is noted that the fitting of the cup in the hub, which has heretofore necessitated the operation of furnishing both the hub and the cup within narrow limits of tolerance, is accomplished by the operation of mounting the cup in the hub. As this operation is press work, and the hub material will permit of plastic flow, the operation is very simple, inexpensive and precise and the parts are so firmly secured together as to require no other special provision therefor. In view of the great reduction thus effected in the cost of assembling the parts, it becomes economically practicable to apply roller bearings to many uses from which they have heretofore been excluded by reason of the expensive cost thereof.

What I claim is:

1. The process of mounting roller bearing cups in hubs, which comprises the formation of the hub of metal tubing that admits of plastic flow and with an inside diameter less than the outside diameter of the cup by such amount that the cup cannot enter said hub without such plastic flow, forming abutments for the cup in said hub and forcing said cup endwise into said hub and against said abutments.

2. The process of mounting roller bearing cups in tubular metal hubs which admit of plastic flow, which comprises forcing onto said hub a flanged member having a tubular portion whose inner diameter is sufficiently less than the outside diameter of the hub to require plastic flow of the hub metal, thereby reducing the diameter of the hub so that its inside diameter is less than the outside diameter of the cup by such amount that the cup cannot enter said hub without such plastic flow, and forcing said cup endwise into said hub.

3. The process of mounting roller bearing cups in hubs, which comprises forcing onto said hub a flanged member having a tubular portion whose inner diameter is less than the outside diameter of the hub, thereby reducing the diameter of the hub so that its inside diameter is less than the outside diameter of the cup, forcing said cup endwise into said hub, placing an annular disk member on said hub, forcing onto the opposite end of said hub a second flange member similar to said first flange member so that said disk member is firmly held between said flange members and forcing into the opposite end of said hub a second bearing cup.

4. The process of mounting roller bearing cups in hubs, which comprises forcing onto said hub a flanged member having a tubular portion whose inner diameter is less than the outside diameter of the hub, thereby reducing the diameter of the hub so that its inside diameter is less than the outside diameter of the cup, forcing said cup endwise into said hub, placing an annular disk member on said hub, forcing onto the opposite end of said hub a second flange member similar to said first flange member so that said disk member is firmly held between said flange members riveting said flanges and disk member together and forcing into the opposite end of said hub a second bearing cup.

Signed at Canton, Ohio, this 6th day of Mar., 1926.

TRACY V. BUCKWALTER.